United States Patent Office 3,213,734
Patented Oct. 26, 1965

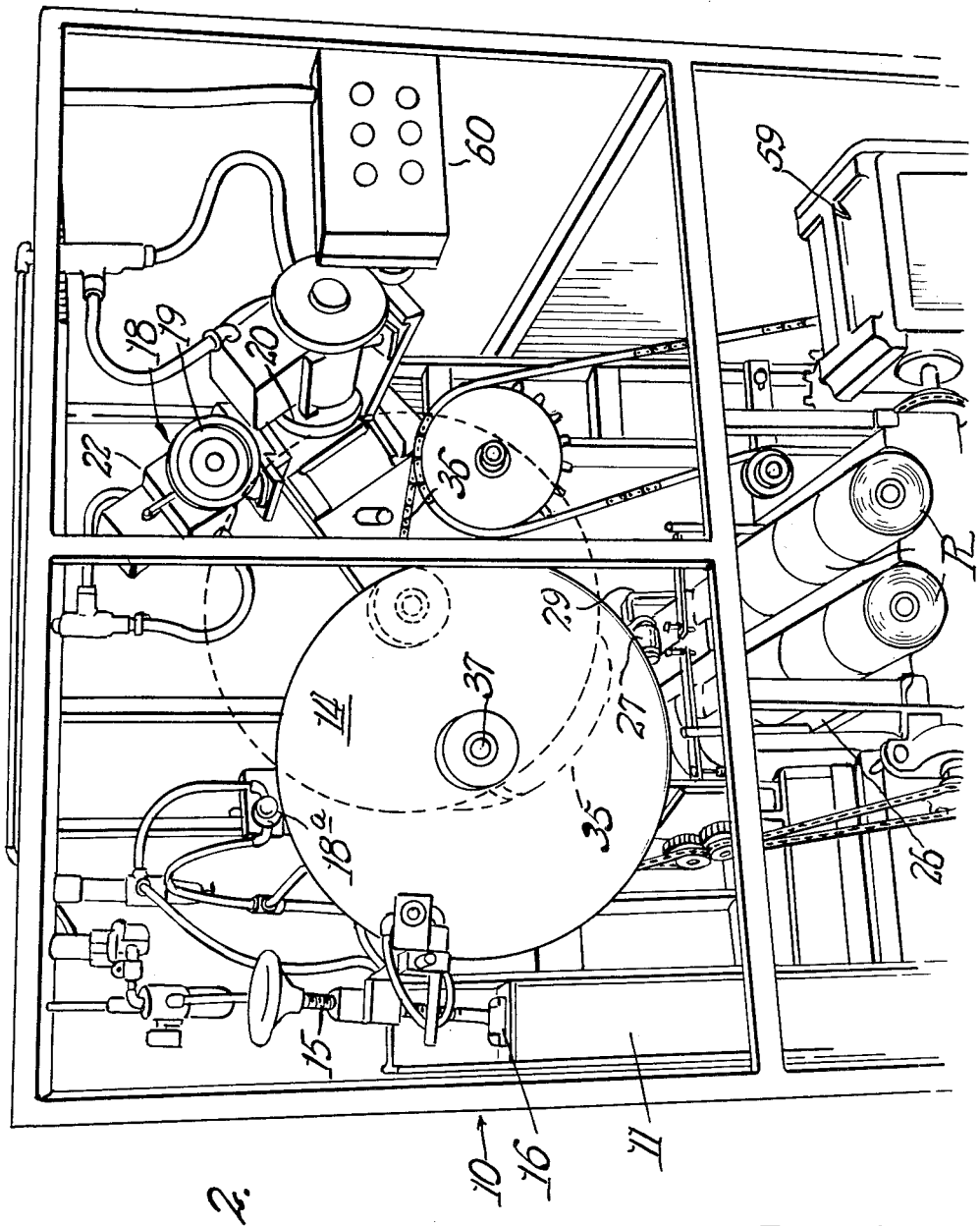

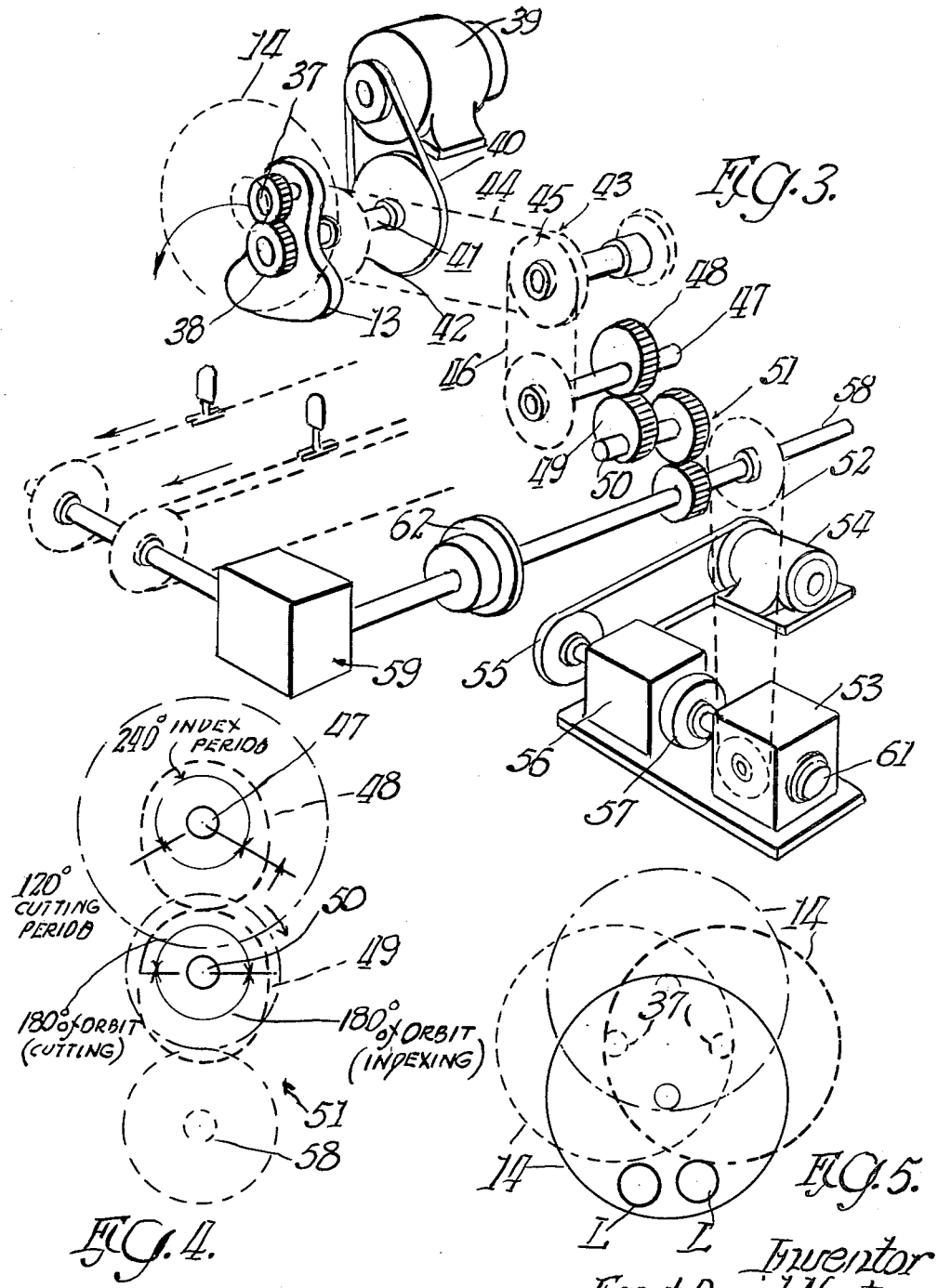

3,213,734
ORBITAL SAW HAVING VARYING ORBIT SPEED WITHIN EACH ORBIT
Ernst Daniel Nystrand, Green Bay, Wis., assignor to Paper Converting Machine Company, Inc., Green Bay, Wis.
Filed July 24, 1964, Ser. No. 385,022
5 Claims. (Cl. 83—257)

This invention relates to an orbital saw, and, more particularly, to a saw especially adapted for the cutting of logs or rolls of paper.

In the manufacture of toilet tissue, for example, it is the practice to unwind the jumbo-sized rolls produced on the paper machine and rewind the sheet into the retail-sized rolls. During this operation, the sheet is usually transversely perforated to permit detachment by the user of squares of tissue. The retail-sized diameter roll developed may be four to nine feet long, and it is desirable to transversely saw or sever this log to obtain individual rolls of correct size immediately following the rewinding operation.

Excellent results are presently obtained with a saw constructed to perform the above operation. However, it would be distinctly advantageous to be able to operate the saw at faster orbital speeds. This then constitutes an objective of the invention.

Another object is to provide a novel saw arrangement wherein an orbital saw is moved at different speeds at different portions of its orbit, whereby indexing or movement of the log or other article being sawed can occur during the slower phase of the orbit while the sawing itself takes place during the faster speed phase of the orbit.

Other objects and advantages of the invention may be seen in the details of construction and operation set down in this specification.

The invention is explained in conjunction with the accompanying drawing, in which—

FIG. 2 is another fragmentary perspective view of the machine, viewed essentially from the product discharge end;

FIG. 3 is a fragmentary perspective view of the power train and associated components for the saw shown in the preceding figures;

FIG. 4 is a schematic representation of the novel gearing employed in the power train of FIG. 3; and FIG. 5 is a schematic representation of the path of travel of the orbiting saw blade.

Figure 1:
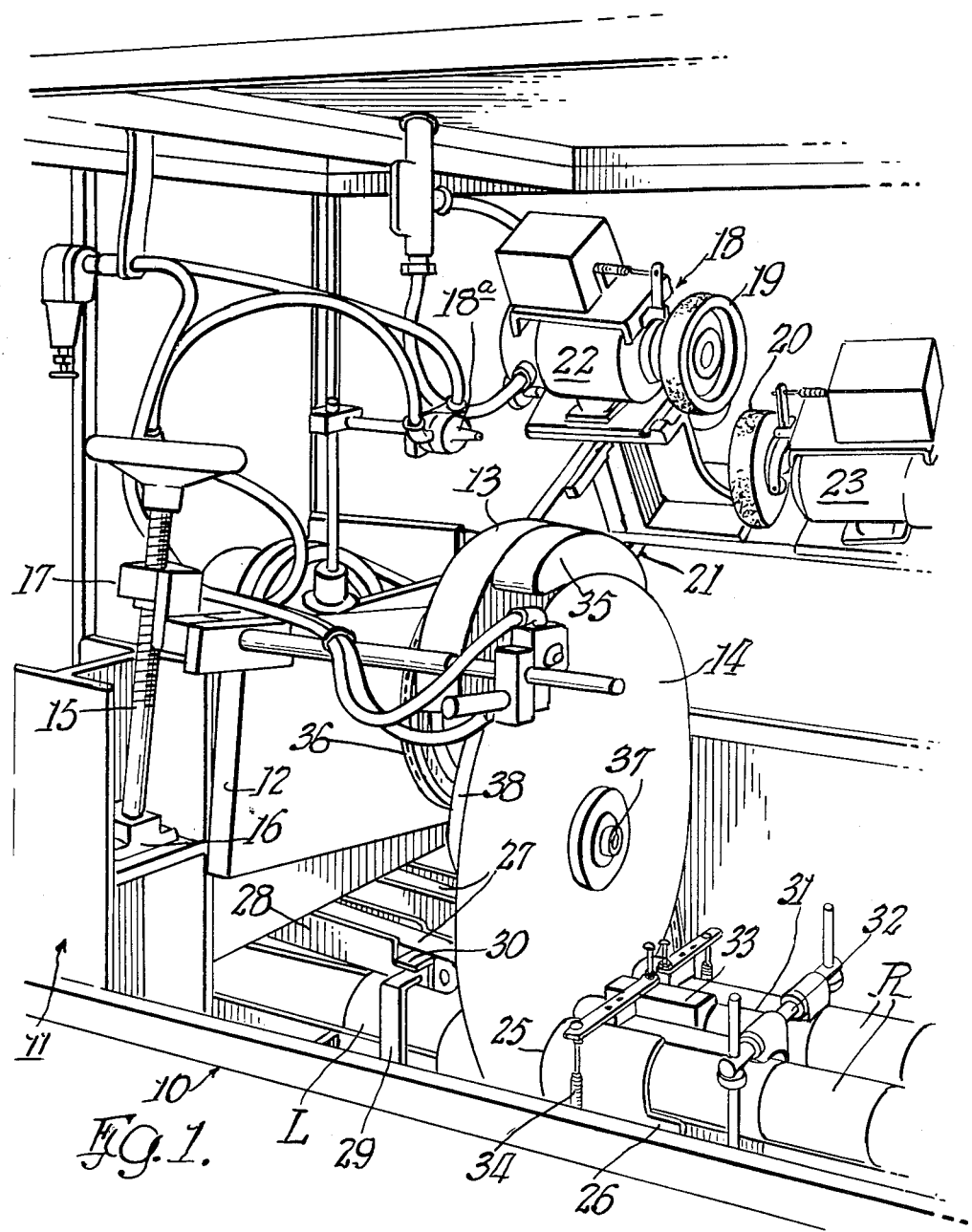
FIG. 1 is a fragmentary perspective view of a machine embodying the teachings of this invention.

In FIG. 1, the frame of the machine is generally designated by the numeral 10 and is seen to be equipped with a superstructure generally designated 11. The superstructure 11 is equipped with a positionable beam member 12 carrying a disc wheel 13, blade 14 and associated shafting. The beam 12 is positionably related with respect to the remainder of the superstructure 11 by means of a threaded member 15 pivoted on the superstructure 11 as at 16. The member 15 threadedly engages an integral block 17 provided as part of the beam 12 so as to lower the disc blade 14 when the same becomes worn and thus of smaller diameter.

Also seen in FIGS. 1 and 2 is a grinding wheel arrangement generally designated 18 and which includes grinding wheels 19 and 20 inclined relative to each other and to the plane of the blade 14 so as to develop a double beveled edge on the blade 14. The grinding mechanism 18 is mounted on a cantilevered beam portion 21 provided as part of the superstructure 11, and the wheels 19 and 20 are each carried on the shafts of drive motors 22 and 23, respectively. The motors 22 and 23 may be operated continuously so that once during each orbit of the blade 14 a sharpening action is performed and at a point corresponding to about two o'clock in the orbit wherein the blade 14 is fully clear of the log L (see FIG. 1). Coolant may be provided via the jet 18a.

The logs L may be controlled during advancement in the troughs 26 toward the slot 25 by means of floating belts 27. Each belt 27 is entrained about end rollers carried by side frames 28. The side frames 28 are supported in floating relation to the main frames 10 by means of arms 29 by virtue of engaging the clips 30 fixed to the side frames 28.

The troughs 26 may be equipped with closure portions as at 31 to facilitate removal of the rolls R from the cutting station. The closures 31 are seen to be pivotally supported upon a cross member 32 and are also secured to a block 33, a slight downward pressure being exerted by means of springs 34.

Inasmuch as the orbiting blade 14 is moving generally horizontally during the cutting operation and because there is no reciprocation, the sawing operation being characterized by only downward and forward movement of the blade 14, it is unnecessary to tightly clamp the logs, as was the previous practice. With the instant construction, indexing is achieved during the upper half of the orbit of the disc blade 14, the blade entering the log in the right-hand trough in FIG. 1, for example, at about four o'clock in the orbit.

Both the rotational and orbital speeds of the blade 14 can be increased substantially over those known heretofore because of the dynamic balancing in the system. In one aspect, this is enhanced by the use of a counterweight as at 35, the counterweight 35 being carried on the disc wheel 13. The blade 14 develops a "slashing" cut in the nature of drawing a knife through the log to be severed. In FIG. 1, the disc blade 14 is chain-driven as at 36, and the gears for driving the blade shaft 37 are completely enclosed in a housing portion as at 38.

Referring now to FIG. 3, it will be seen that the disc blade 14 is driven by a motor 39. For this purpose, the motor 39 is equipped with a belt drive as at 40. The belt drive 40 rotates a shaft 41 at high speed—the shaft 41 being carried in the beam member 12. The shaft 41 carries the spur gear 38 which meshes with a companion gear carried on the saw shaft 37.

Orbital movement of the blade 14 is developed through rotating the disc wheel 13 about the axis of the shaft 41. The disc wheel 13 is journaled on the shaft 41 and is coupled directly to a sprocket 42. Thus, as the sprocket 42 rotates, the disc wheel 13 rotates with it and causes the spur gear on shaft 37 to move in a planetary fashion about the gear designated 38 and which is fixed to the shaft 41.

A power train generally designated 43 is provided to rotate the sprocket 42 and this includes a chain 44 entrained over an idler sprocket 45 as well as the previously-mentioned sprocket 42. A second chain and sprocket arrangement 46 is associated with a shaft 47 suitably journaled in the frame 10 for the purpose of delivering rotational power to the sprocket 45. The shaft 47 carries a driven elliptic gear 48 which meshes with the driver elliptic gear 49—the later being carried on a shaft 50. The shaft 50 receives its power through gearing generally designated 51 and a chain and sprocket arrangement 52 which is also coupled to a gear box 53. The gear box 53 ultimately receives power from a motor 54 through a belt drive 55, a primary gear box 56, and an electric clutch 57.

It will be noted that a line shaft 58 is interposed in the power train so as to synchronize the indexing of the logs L with the movement of the orbiting saw blade 14. The indexing is regulated by an indexing mechanism generally designated 59 (see also FIG. 2). Control of the various devices is achieved through the pushbutton electric box 60.

In the specific illustration given, in order to increase the speed of the operation, two-thirds of each complete time cycle is used for indexing the log L forwardly. This is accomplished by causing the orbiting head or disc wheel 13 to move through its 180° of rotation devoted to the cutting operation during 120° or one-third of each complete time cycle—and the 180° of its rotation devoted to log indexing during 240° or two-thirds of each complete time cycle. This allows a 33⅓ increase in output of the saw without increasing the load on the indexing device 59.

The rotational speed of the orbiting saw is varied by driving the head 13 through a set of elliptic gears. The geometry of the elliptic gears causes the driven gear to rotate 180° during 120° of rotation of the driver gear. The remaining 180° of rotation of the driven gear takes place during 240° of rotation of the driver gear.

In operation, the right-angled gear box 56 is driven by the belt drive 55 from the motor 54. The right-angled gear box 56 is connected to another right-angled gear box 53 by means of an electric clutch 57. Opposite the clutch on the gear box is mounted an electric brake 61 which is attached to to the frame 10 of the machine. A chain drive 52 from the right-angled gear box drives the shaft 58, which in turn drives the indexing device 59 through an overload clutch 62. A set of spur gears 51 couples the shaft 58 with the driver gear shaft 50. The shaft 47 is rotated by the driven elliptic gear 48 and the double idler sprocket 45 is driven by the chain and sprocket arrangement 46. Thus, the rotational speed of the system starting with shaft 47 is varied by the elliptic gears. The contour of the elliptic gears can be seen in FIG. 4, where the driven gear 48 develops a 240° index period and a 120° cutting period, and each complete cycle time period is represented by 360°.

While in the foregoing specification a detailed description of an embodiment of the invention has been set down for the purpose of illustration, many variations in the details herein given may be made by those skilled in the art without departing from the spirit and scope of the invention.

I claim:

1. An orbital saw for radially cutting elongated paper rolls, comprising: a frame, conveying means on said frame for intermittently advancing said rolls along a path longitudinally thereof, a disc saw orbitally mounted on said frame adjacent said conveying means, means for rotating said disc saw, and means including a saw-carrying disc for orbiting said saw in a plane transverse of said path to pass said saw through a roll in said path in one portion of the saw orbit and for developing a faster orbital velocity of said saw in said one orbit portion than in the remainder of the orbit, said orbiting means including a motor and elliptical gears interconnecting said motor and disc.

2. The structure of claim 1 in which said orbiting means is arranged and constructed relative to said conveying means to provide cutting during about one-half of the saw orbit while said conveying means indexes the roll during the other half of the saw orbit, the cutting portion of the orbit constituting about one-third the time necessary to complete an orbit.

3. The structure of claim 2 in which said conveying means includes a pair of pusher-equipped troughs for simultaneously indexing a pair of elongated rolls in side-by-side relation.

4. An orbital saw for radially cutting elongated paper rolls, and the like, comprising a frame, a first shaft journaled in said frame for rotation only, motor means on said frame coupled to said first shaft for rotating the same, disc means rotatably mounted on said shaft, a second shaft journaled in said disc means eccentric to said first shaft and having a disc saw fixed thereto, gear means interconnecting said first and second shafts for transmitting rotational power from said motor means to said disc saw, means in said frame coupled to said disc means for rotating the same whereby said second shaft and its disc saw follow an orbit about said first shaft, said disc means-rotating means including a pair of elliptic gears for developing different speeds of movement of said disc saw in different portions of each orbit thereof, and means on said frame for advancing rolls through a path intersecting said orbit, said advancing means being operatively connected to said disc-rotating means for advancing said rolls in an intermittent fashion during the orbit time cycle portion said disc saw is out of intersecting relation with said rolls, said orbit time cycle portion constituting a major portion of the total orbit cycle time.

5. The structure of claim 4 in which said advancing means is operatively connected to said disc means-rotating means for advancing said rolls in an intermittent fashion during the orbit time cycle portion said disc saw is out of intersecting relation with said rolls, said orbit time cycle portion constituting about two-thirds of the total orbit time cycle.

References Cited by the Examiner

UNITED STATES PATENTS

| 1,897,867 | 2/33 | Sieg | 83—324 X |
| 2,109,786 | 3/38 | Taft | 83—494 X |
| 2,759,542 | 8/56 | Weisshuhn | 83—494 X |
| 2,822,844 | 2/58 | Busch | 83—174 X |
| 3,049,954 | 8/62 | Barlament et al. | 83—207 X |
| 3,114,282 | 12/63 | Reifenhauser et al. | 83—592 X |

ANDREW R. JUHASZ, *Primary Examiner.*